Patented May 4, 1954

2,677,709

UNITED STATES PATENT OFFICE 2,677,709

PROCESS FOR THE PREPARATION OF PHENOLS

Johan R. H. Goris, Geleen, Netherlands

No Drawing. Application November 21, 1952,
Serial No. 321,949

Claims priority, application Netherlands
March 17, 1948

3 Claims. (Cl. 260—628)

The present invention relates to the preparation of phenol from alkali metal salts of benzene sulfonic acid.

It has previously been proposed to prepare phenol by reacting salts of benzene sulfonic acid with alkaline earth hydroxides in the presence of steam. Such procedures are described in U. S. Patent No. 2,407,044, and provide a number of advantages over earlier procedures for making phenol. However, the procedures described in U. S. Patent No. 2,407,044 also suffer from several disadvantages which seriously limit their commercial attractiveness. For example, substantial quantities of steam must be used in these procedures and this is highly undesirable when operating on a commercial scale, not only because of the obvious difficulties in insuring sufficient steam for reaction purposes, but also because of the necessity of handling substantial amounts of condensed steam from which volatilized phenol must be recovered.

Furthermore, when producing phenol according to the procedures described in Patent No. 2,407,044, swelling or frothing of the reaction mixture occurs and the latter tends to adhere to the walls of the reaction vessel with the result that steam passage through the reaction mixture is impeded, unless special froth-preventing precautions are followed.

To eliminate the above-mentioned frothing and swelling difficulties, the proposal is made in U. S. Patent No. 2,407,044 to utilize steam at pressures above atmospheric. This expedient will eliminate, or at least decrease, frothing or swelling of the reaction mixture, but it makes control of the reaction troublesome and, in general, renders these procedures difficult to operate satisfactorily on a commercial scale.

Numerous other attempts have been made to avoid frothing or swelling of the reaction mixture used for producing phenol in procedures generally similar to those described above. For instance, in British Patent No. 559,642, which corresponds to U. S. Patent No. 2,407,045, it is suggested that the hydroxides of calcium, barium, strontium or magnesium be added as foam preventatives in a phenol-forming reaction mixture consisting of a salt of sulfonic acid and caustic alkali. When the alkaline earth metal hydroxides are used in specified proportions, according to such procedures, frothing or swelling of the reaction mixture is avoided, but if these proportions are exceeded, e. g., if the caustic alkali is entirely replaced by the alkaline earth metal hydroxide, the frothing or swelling difficulties referred to continue to occur.

In my copending U. S. application S. N. 81,830, filed March 16, 1949, and now abandoned, and a continuation-in-part thereof, S. N. 274,651, filed March 3, 1952, there has been described a process for producing phenol in a manner which avoids swelling or frothing of the reaction mixture involving the preparation of a dried reaction mixture of quick lime and alkali metal sulfonate followed by the heating of this mixture in the presence of steam.

It has now been unexpectedly found that the difficulties of the prior procedures for producing phenol by reaction of benzene sulfonate with alkaline earth metal hydroxides can be overcome in another way to give highly desirable, commercially attractive procedures for producing phenol. Hence, the principal object of the present invention is the provision of novel improvements in the production of phenol.

A further object of the invention is the provision of novel phenol-producing procedures which proceed smoothly without frothing and swelling and are otherwise free of the disadvantages noted above in connection with previously known procedures of the same general type.

A more specific object of the invention is the provision of improved procedures for producing phenol of the type described above which, in addition to avoiding the tendency of the reaction mixture to foam or swell, can be carried out with a minimum amount of steam at atmospheric pressure, thereby eliminating the difficulties involved in the procedures of U. S. Patent No. 2,407,044.

Still further objects and entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished, according to the present invention, by producing phenol from an alkaline earth metal hydroxide and an alkali metal or alkaline earth metal salt of benzene sulfonic acid by first forming a dry reaction mixture of the salt and hydroxide in such proportions that the hydroxide is present in excess of that theoretically required for formation of the phenol up to 1½ gram equivalents per gram equivalent of the acid salt, thereafter heating said dry reaction mixture at a temperature of between 350° and 450° C. in the substantial absence of steam and in an inert gas, as hereinafter mentioned, discontinuing said stream of gas when up to about ½ of said sulfonic acid salt has been converted to the corresponding phenolate and continuing the heating of said reaction mixture at a temperature of between 350° and 450° C. in the presence of steam until substantially all of the unreacted sulfonic acid salt and the phenolate formed are converted into phenol.

The success of the invention, as generally described above, resides, at least to a substantial extent, in the discovery that if a reaction mixture of the type indicated is initially heated in the presence of certain inert gases in the manner described, the resulting mixture is peculiarly adapted for treatment with a minimum quantity of steam, preferably at atmospheric pressure, to give phenol without frothing or swelling of the reaction mixture.

This result is extremely surprising as evidenced by the fact that if the initial heating step is omitted, and the reaction mixture heated directly in the presence of steam, at atmospheric pressure, frothing or swelling of the reaction mixture occurs almost immediately to such an undesirable degree that the reaction must in many cases be discontinued. Another unusual feature is the fact that, according to the invention, the desired results are obtained, using a reaction mixture containing no more than 1½ gram equivalents of hydroxide per gram equivalent of the salt, whereas in prior procedures, where an inert gas has been utilized to produce phenolates, substantially greater proportions of hydroxide are necessary. Such larger amounts of hydroxide are undesirable in the present procedures.

The reactants used in the present invention may be mixed together in the necessary proportions in any convenient way. Preferably, however, the alkaline earth metal hydroxide is added to an aqueous solution of the sulfonic acid salt with stirring. Subsequently, the resulting mixture is dried, for instance, by means of a rotary drier and pressed into briquettes, pellets, tablets, or similar products by means of a briquette or pellet compressing machine or similar device. Alternatively, a granular reaction mixture may be obtained by simply drying the mixture in any convenient fashion while stirring.

As the inert gas, there should be used nitrogen, hydrogen, carbon monoxide, hydrocarbons which are gaseous at the reaction temperature or mixtures of such gases. These gases are preferably preheated prior to passage through the reaction mixture and, while the proportions thereof can be widely varied, they are usually used in the ratio of 50 parts to 500 part per 1000 parts of the sulfonic acid salt.

The initial heating of the reaction mixture in the inert gas can be carried out to the point where slightly more than one-half of the sulfonate has been converted to phenolate. This represents the endpoint of this phase of the reaction, but it is not normally necessary to carry the initial heating this far, same being discontinued generally when half or less than half of the sulfonate has been converted. The actual period of time utilized for this initial heating step can be widely varied and depends primarily upon the manner in which the reaction mixture has been prepared. For example, if the reaction mixture has been obtained from an aqueous solution of the two reactants which has been dried under simultaneous stirring so that grains measuring on the average between 4 to 6 mm. in diameter have been formed, the initial heating, after the reaction temperature within the range mentioned has been attained, need only be of short duration, for instance, from 10 to 30 minutes. After this treatment, the inert gas stream is discontinued and heating of the reaction mixture carried out in the presence of steam to give an unimpeded formation of phenol without frothing or swelling of the reaction mixture. Likewise, if the reaction mixture consists of irregular grains, scales or small pieces, a short period of time, e. g., 10 to 30 minutes, is also sufficient for the initial heating step and the same is true if the reaction mixture has been pressed into briquettes, pellets, tablets or similar products, provided the compressing pressure utilized to form the reaction mixture does not exceed 100 kg./cm.² On the other hand, if the reaction mixture is formed into briquettes or similar products, using higher pressures than that stated above, the initial heating period in the presence of inert gas is desirably of longer duration. For example, where tablets formed under pressure of 200 kg./cm.² are utilized, 1½ hours are preferably employed, although it has been found that in cases where small pellets measuring 10 mm. diameter, or tablets or other products of like size or mixtures thereof, obtained at pressures higher than 100 kg./cm.², are used, the shorter heating periods referred to above, i. e., 10 to 30 minutes, can be satisfactorily utilized.

The temperature at which the initial heating step and subsequent reaction in the presence of steam are carried out may be varied within the range of 350° to 450° C. A very rapid proceeding of the reaction and favorable yields of phenol amounting to 90% or more, calculated with respect to the amount to be obtained theoretically, are made possible if the reaction is carried out at temperatures of 400° to 420° C.

The hydroxides of alkaline earth metals used in the process according to the invention may be the hydroxides of calcium, barium, strontium or magnesium, or mixtures of these substances. In this connection, the application of slacked lime has been found to be particularly advantageous.

The customary salts of benzene sulfonic acid, such as the alkali metal and alkaline earth metal benzene sulfonates, and particularly, potassium and sodium benzene sulfonates, or mixtures of these, may be used as the sulfonic acid salts in the procedures of the invention. If desired, other substances having a favorable effect upon the reaction may be added to these salts, such as potassium salts, for instance, potassium chloride, potassium sulfite, etc.

While the amount of steam utilized for converting the sulfonate and phenolate to phenol can be widely varied, one of the main advantages of the present invention, as indicated above, is the fact that relatively small amounts of steam may be utilized, thus minimizing the quantity of condensate which must be handled for recovery of the phenol. Generally speaking, it has been found that from 30 to 40 grams per hour of steam at atmospheric pressure is sufficient for each 100 grams of sulfonate originally present in the reaction mixture. It will, however, be appreciated that larger amounts of steam may also be utilized, although for practical reasons, it is preferred to operate within the stated range. Likewise, steam at superatmospheric pressures may be utilized, although, as indicated above, another of the important advantages of the present procedures is that it is possible to operate with steam at atmospheric pressure while, at the same time, avoiding frothing and swelling of the reaction mixture without specifically adding any foam preventive to the mixture.

The procedures of the present invention can be more readily understood from the following examples which are given for purposes of illustration only and are not intended to limit the scope of the invention.

*Example I*

28.5 grams of calcium hydroxide are added to a solution of 100 grams of potassium benzene sulfonate in water and the pulp obtained is dried by evaporation while being stirred. As a result of this operation the product is granulated.

The grains are introduced into a reaction space and heated up to 400° to 420° C. while a stream of nitrogen is passed across them. At this temperature, the grains are kept in the atmosphere of $N_2$ for 30 minutes, in which length of time about one-half of the sulfonate is converted to phenolate. After this, the nitrogen is substituted by a stream of steam. As a result of the initial heating in the presence of nitrogen, the grains do not swell or froth during the continued heating in the presence of steam. The steam, which is passed in hourly amounts of 100 grams per 300 grams of potassium benzene sulfonate, has a temperature of approximately 420° C. The vapors leaving the reaction space are condensed after which the phenol obtained is separated from the water. After steam is passed into the reaction mixture for 1½ hours, it is found that 98% of the potassium benzene sulfonate originally present in the reaction mixture has been converted and 43 grams of phenol have been obtained coresponding at this degree of conversion with an efficiency of 91.5% of the theoretical amount.

*Example II*

30 grams of slacked lime are added to a solution of 100 grams of sodium benzene sulfonate and 30 grams of KCl in water and the pulp obtained is dried by evaporation under simultaneous stirring so that a granular product is formed.

The grains are treated in the manner described in Example I. After steam has been passed into the reaction mixture for 2½ hours, it is found that 75% of the sodium benzene sulfonate has been converted. The yield amounts to 35 grams of phenol, corresponding, at this degree of conversion, with an efficiency of 90% of the theoretical amount.

*Example III*

28.5 grams of calcium hydroxide are added to a solution of 100 grams of potassium benzene sulfonate in water and the pulp obtained is dried by evaporation while being stirred. After grinding, the mixture is pressed into briquettes under a pressure of 75 kg./cm². The briquettes are placed in a reaction space and further treated as described in Example I. After initial heating during 30 minutes at 400° to 420° C. in the presence of $N_2$, the substitution of $N_2$ by steam was found not to cause froth formation.

After steam has been passed for 1½ hours, 97% of the potassium benzene sulfonate has been converted and 42.5 grams of phenol have been obtained, corresponding at this degree of conversion, with an efficiency of 91% with respect to the theoretical amount.

*Example IV*

This example illustrates operations according to U. S. Patent No. 2,407,044, using large quantities of steam at atmospheric pressure and omitting the inert gas step of the invention.

28.5 grams of calcium hydroxide are added to a solution of 100 grams of potassium benzene sulfonate in water and the pulp obtained is dried by evaporation while being stirred. After grinding, the mixture is pressed into briquettes and then charged into a reaction vessel in which the briquettes are heated at a temperature of between 400° to 420° C. in the presence of steam at atmospheric pressure preheated to a temperature of about 420° C. The steam is admitted to the reaction vessel at the hourly rate of 400 grams per 100 grams of sulfonate. After only a few minutes, the reaction mixture formed a frothing mass of considerable volume preventing the further passage of steam therethrough and requiring the discontinuance of the reaction.

It will be seen from the foregoing description that the present procedures provide a relatively straight forward solution to the problem of frothing and swelling of the reaction mixture in the production of phenol. By virtue of the initial heating step in inert gas, they require the use of only a minimum amount of steam, preferably at atmospheric pressure, for satisfactory operation and thus represent significant advantages over prior procedures, particularly when utilized in large scale commercial operations.

The present application is a continuation-in-part of Serial No. 81,829, filed March 16, 1949, and now abandoned.

Having described my invention, what I claim is:

1. A process for the production of phenol which comprises forming a dry reaction mixture of a salt selected from the group consisting of the alkali metal and alkaline earth metal salts of benzene sulfonic acid, and an alkaline earth metal hydroxide wherein the hydroxide is present in excess of that theoretically required for formation of the phenol up to 1½ gram equivalents per gram equivalent of the acid salt, thereafter heating said dry reaction mixture for at least 10 minutes at a temperature of between 350° and 450° C. in an inert gas selected from the group consisting of nitrogen, hydrogen, carbon monoxide, hydrocarbons which are gaseous at said temperature, and mixtures of the aforementioned gases, discontinuing said gas treatment when not more than about ½ of said sulfonic acid salt has been converted to the corresponding phenolate and continuing the heating of said reaction mixture at a temperature of between 350° and 450° C. in steam until substantially all of the unreacted sulfonic acid salt and the phenolate formed are converted into phenol, said process being characterized by the absence of any substantial amount of frothing.

2. The process of claim 1, wherein the steam is utilized at substantially atmospheric pressure and in a quantity of between 30 and 40 grams per hour for each 100 grams of sulfonate in the reaction mixture.

3. The process of claim 1, wherein the heating in inert gas is carried out for a period of between about 10 and 90 minutes.

References Cited in the file of this patent

UNITED STATES PATENTS

| Number | Name | Date |
|---|---|---|
| 2,407,044 | Tyrer | Sept. 3, 1946 |
| 2,407,045 | Tyrer | Sept. 3, 1946 |
| 2,451,996 | Tyrer | Oct. 19, 1948 |
| 2,452,404 | Tyrer | Oct. 26, 1948 |